US012562616B2

(12) United States Patent
McMillan

(10) Patent No.: US 12,562,616 B2
(45) Date of Patent: Feb. 24, 2026

(54) MOTOR WITH EXPANDABLE CASING

(71) Applicant: McMillan Electric Company, Woodville, WI (US)

(72) Inventor: Douglas deHaas McMillan, Hudson, WI (US)

(73) Assignee: McMillan Electric Company, Woodville, WI (US)

( * ) Notice: Subject to any disclaimer, the term of this patent is extended or adjusted under 35 U.S.C. 154(b) by 267 days.

(21) Appl. No.: 18/457,786

(22) Filed: Aug. 29, 2023

(65) Prior Publication Data

US 2024/0421654 A1 Dec. 19, 2024

Related U.S. Application Data

(63) Continuation-in-part of application No. 18/335,539, filed on Jun. 15, 2023, now abandoned.

(51) Int. Cl.
*H02K 5/22* (2006.01)
*H02K 15/06* (2006.01)

(52) U.S. Cl.
CPC .............. *H02K 5/22* (2013.01); *H02K 15/06* (2013.01)

(58) Field of Classification Search
CPC ........ H02K 15/00; H02K 15/06; H02K 15/14; H02K 5/00; H02K 5/15; H02K 5/22
See application file for complete search history.

(56) References Cited

U.S. PATENT DOCUMENTS

| | | |
|---|---|---|
| 4,415,824 A | 11/1983 | Meier |
| 5,873,710 A | 2/1999 | Tucker |

| | | |
|---|---|---|
| 7,538,468 B2 | 5/2009 | Kobayashi et al. |
| 8,541,923 B2 | 9/2013 | Leiber et al. |
| 10,965,176 B2 | 3/2021 | Wasson et al. |
| 2009/0289522 A1 | 11/2009 | Buban |
| 2022/0149679 A1* | 5/2022 | Werner .................. H02K 15/12 |

(Continued)

FOREIGN PATENT DOCUMENTS

| | | |
|---|---|---|
| CN | 203645428 U | 6/2014 |
| CN | 112997387 A | 6/2023 |
| DE | 202015008845 U1 | 2/2017 |

(Continued)

OTHER PUBLICATIONS

English translation of WO-2005011084-A 1, accessed Apr. 3, 2025 via Espacenet, <https://translationportal.epo.org/emtp/translate/?ACTION=description-retrieval&COU NTRY=WO&ENG IN E=google &FORMAT=docdb&KI N D=A 1 &LOCALE=en_EP&N UM BER= 2005011084&SRCLANG=de&TRGLANG=en> (Year: 2005).

(Continued)

*Primary Examiner* — Tran N Nguyen

(74) *Attorney, Agent, or Firm* — Merchant & Gould P.C.

(57) ABSTRACT

An electric motor casing. A method of manufacturing an electric motor casing. A method of assembling an electric motor. An electric motor including a motor casing and an interior assembly press fitted to the motor casing. According to certain examples, the motor casing includes a structural feature that changes shape to allow the motor casing to expand when the interior assembly is press fitted to the motor casing. According to certain examples, the interior assembly is press fitted to the motor casing without heating the motor casing.

19 Claims, 12 Drawing Sheets

(56)     References Cited

U.S. PATENT DOCUMENTS

| | | | |
|---|---|---|---|
| 2023/0378846 | A1 | 11/2023 | Eichinger |
| 2024/0421654 | A1 | 12/2024 | McMillan |

FOREIGN PATENT DOCUMENTS

| | | | | | |
|---|---|---|---|---|---|
| DE | 102019200023 | A1 | * | 7/2020 | |
| ES | 1052516 | U | | 12/2002 | |
| JP | 6032531 | A | * | 2/1985 | |
| JP | 2004112988 | A | * | 4/2004 | .............. H02K 5/04 |
| WO | WO2005011084 | A1 | * | 2/2005 | |

OTHER PUBLICATIONS

U.S. Appl. No. 18/335,539—Third-Party Submission Under 37 CFR 1.290 Concise Description of Relevance, dated May 19, 2025 (19 pages).

* cited by examiner

200

200

MOTOR WITH EXPANDABLE CASING

BACKGROUND

Electric motors use electric current to power a torque shaft. The shaft can be coupled to a machine or other device to provide motive power. Electric motors typically include an outer motor casing that houses an interior assembly. The interior assembly typically consists of the torque shaft, a rotor, and a stator. When electric current is run through wire windings of the stator, for example, an electromagnet is formed that interacts with the rotor to cause the rotor to spin. The rotor's rotation can cause the drive shaft to spin.

Electric motors commonly generate a large amount of heat when they are running. To prevent overheating, heat can be dissipated to the motor's external surroundings via the casing.

SUMMARY

The present disclosure relates generally to an electric motor. More particularly, the present disclosure relates to an electric motor, and/or one or more electric motor components, and/or methods of assembling electric motors, having one or more features that can improve the motor's heat dissipation characteristics for dissipating heat generated within the motor casing to the motor's external environment.

According to certain aspects, the present disclosure relates to an electric motor casing, including: a casing housing including an inner surface and an outer surface, the casing housing extending along an axis defined by the casing housing from a first end of the casing housing to a second end of the casing housing opposite the first end, the interior surface of the casing housing including a channel, the channel being elongate parallel to the axis, the casing housing being configured to receive within the casing housing an interior motor assembly inserted into the casing housing through the first end or the second end along the axis.

According to further aspects, the present disclosure relates to an electric motor assembly, including: a casing housing including an inner surface and an outer surface, the casing housing extending along an axis defined by the casing housing from a first end of the casing housing to a second end of the casing housing opposite the first end, the interior surface of the casing housing including a channel; and an interior motor assembly configured to be press fitted to the casing housing by inserting the casing housing through the first end or the second end along the axis, wherein the channel is configured to change shape when the interior motor assembly is press fitted to the casing housing.

According to further aspects, the present disclosure relates to a method of assembling an electric motor, including: inserting an interior motor assembly within a motor casing housing, to press fit the interior motor assembly to the motor casing housing, the inserting causing a structural feature of the motor casing housing to change shape and further causing the motor casing housing to expand, wherein no heat is applied to the motor casing to press fit the interior motor assembly to the motor casing housing other than heat generated by the inserting.

The above summary is not intended to describe each disclosed embodiment or every implementation of the present disclosure. Figures in the detailed description that follow more particularly exemplify embodiments of the disclosure.

While certain embodiments will be illustrated and described, the disclosure is not limited to use in such embodiments.

DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
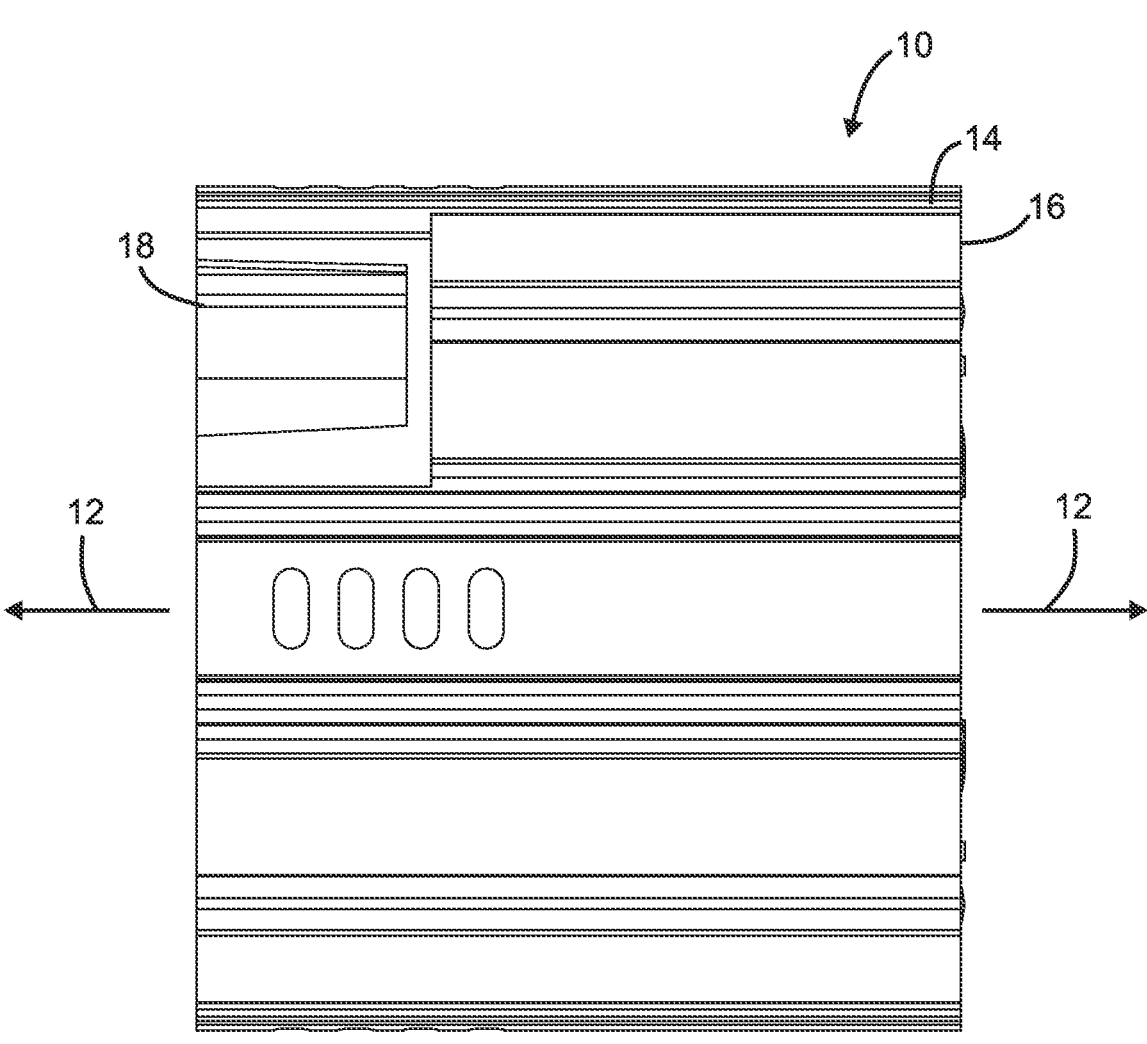
FIG. 1 is a side view of an example electric motor assembly according to the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The present disclosure relates to improvements in electric motors. In some examples, the motor can be a direct current (DC) motor. In some examples, the motor can be an alternating current (AC) motor. In some examples, the motor can be a permanent magnet direct current (PMDC) motor. In some examples, the motor can be a brush motor, e.g., a DC brush motor. In some examples, the motor can be a brushless motor, e.g., a brushless DC motor. In some examples, the motor can be any other type of electric motor having a casing, a stator and a rotor.

The specific components of the interior assembly that is housed in the motor casing can depend on the type of electric motor. For example, a DC motor or PMDC motor can include a commutator as part of the interior assembly. As another example, a brush DC motor can include a brush assembly.

The motors of the present disclosure can be implemented in any suitable machine, device, or other context, such as a vehicle, a household appliance, etc.

It will be appreciated that the motors of the present disclosure can alternatively serve as electric current generators, whereby torque is applied to the rotor to spin the rotor, which generates an electric current in the wire coils that can be used to power another machine or device, charge a battery, and so forth.

Electric motors can generate a large amount of heat when they are running. If an electric motor overheats, the motor can fail, or a component of the motor can fail. Therefore, it is important that motors are able to dissipate the heat that they generate.

Electric motors often include a casing and an interior assembly that is press fit or otherwise secured e.g., with fasteners, to the casing within the interior of the casing. For example, a stator core of an interior assembly of the motor is inserted in a motor casing and secured to the motor casing by press fit. A typical electric motor has a carbon steel motor casing. However, in certain instances carbon steel does not dissipate to the exterior of the motor the heat generated interior to the casing as well as other materials, such as aluminum.

In addition to having good heat dissipation characteristics, an aluminum motor casing can be relatively simple and cost effective to construct, e.g., via an extrusion fabrication process, whereas a carbon steel motor casing, for example, typically requires stamping, rolling and welding of the material, which is much more labor and cost intensive than extrusion. However, aluminum is relatively soft and malleable. Thus, when the interior assembly of the motor is inserted into an aluminum motor casing and thereby press fitted to the aluminum motor casing, the casing can bend or warp in problematic (e.g., uneven) ways that can compromise the motor's functionality.

The present disclosure is directed to improvements in securing a motor interior assembly to a motor casing that is relatively malleable, while minimizing negative impact on the motor's functionality. The motor casing can be constructed of different materials, such as aluminum, steel, or another metal. In some examples, the motor casing can be fabricated using an extrusion process. In other examples, the motor casing can be fabricated by a different fabrication method, such as stamping a metal sheet (e.g., a sheet of steel), rolling the metal sheet, and welding the two ends of the metal sheet together.

Figure 2:
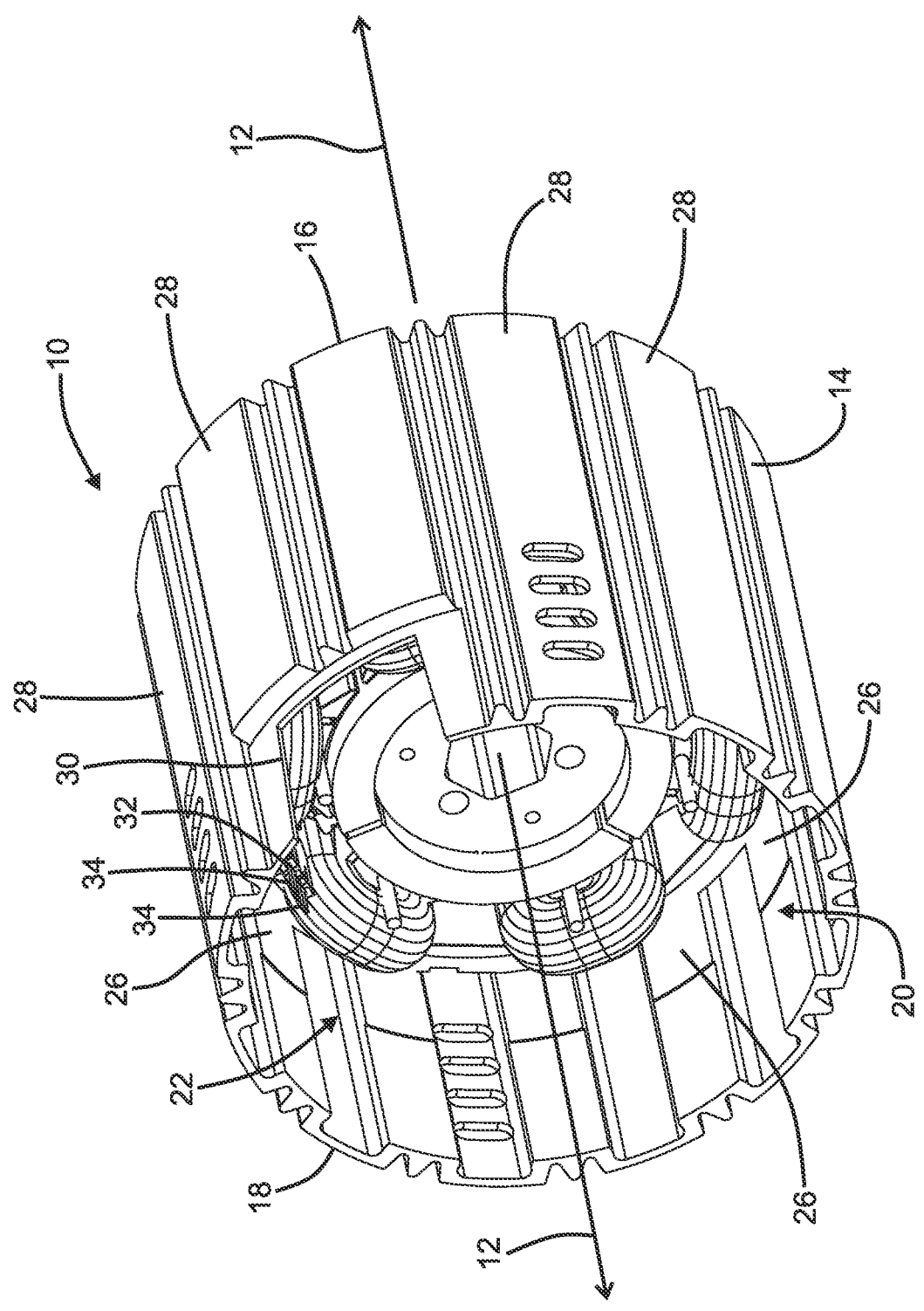
FIG. 2 is a perspective view of the motor assembly of FIG. 1.
Figure 3:
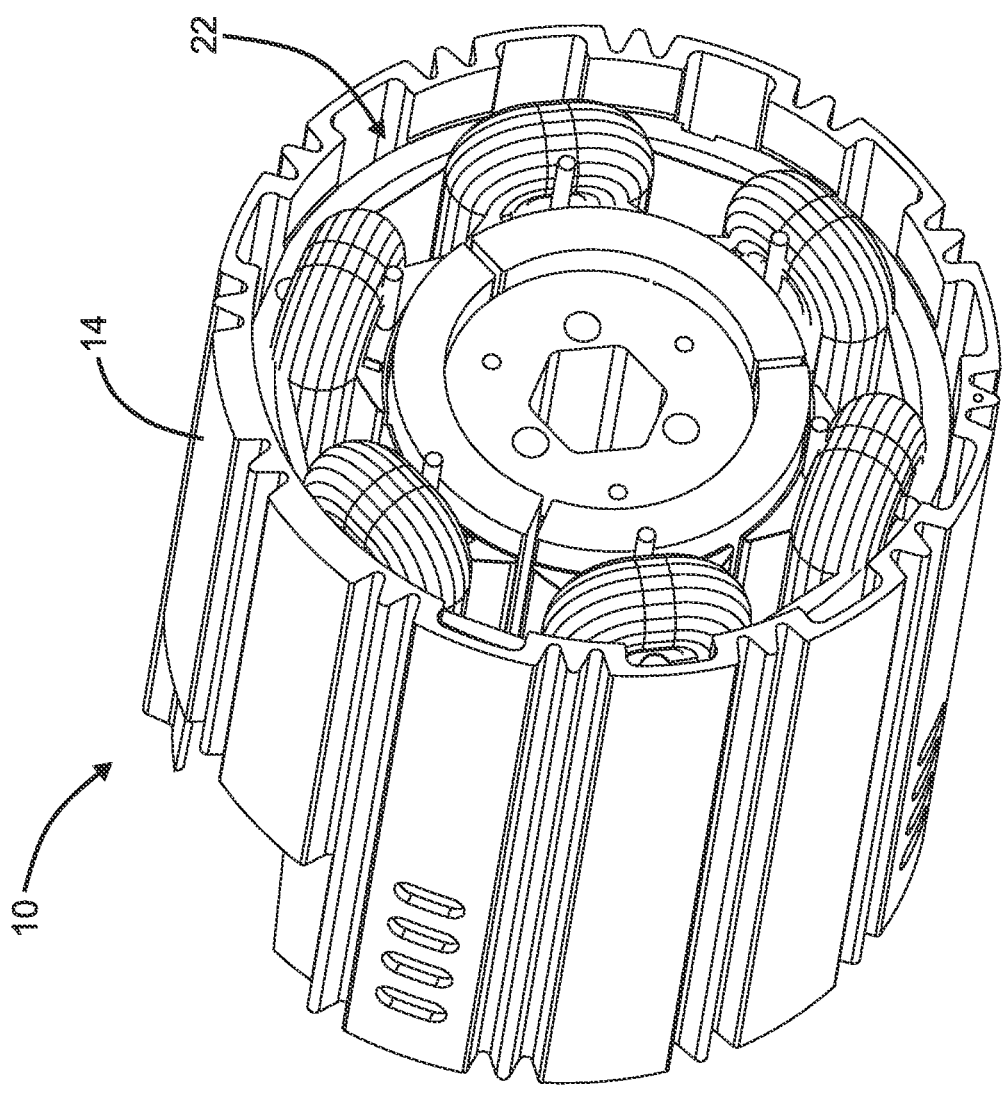
FIG. 3 is a further perspective view of the motor assembly of FIG. 1.

Referring to FIGS. 1-3, an example electric motor assembly 10 is shown. The assembly 10 extends along a central axis 12 defined by a motor casing 14 of the assembly 10. The casing 14 extends parallel to the axis 12 from a first open end 16 of the casing 14 to a second open end 18 of the casing, the second open end 18 being opposite the first open end 16.

The casing 14 defines a housing having an interior 20 that receives an interior assembly 22. The interior assembly 22 and the casing 14 are sized and configured relative to each other such that the interior assembly is inserted into the interior 20 of the casing 14 and thereby press fit to an inner surface or inner surfaces 26 of the casing 14. The inner surfaces 26 generally face radially toward to the axis 12. The casing 14 also includes an outer surface or outer surfaces 28 that generally face radially away from the axis 12.

Figure 9:
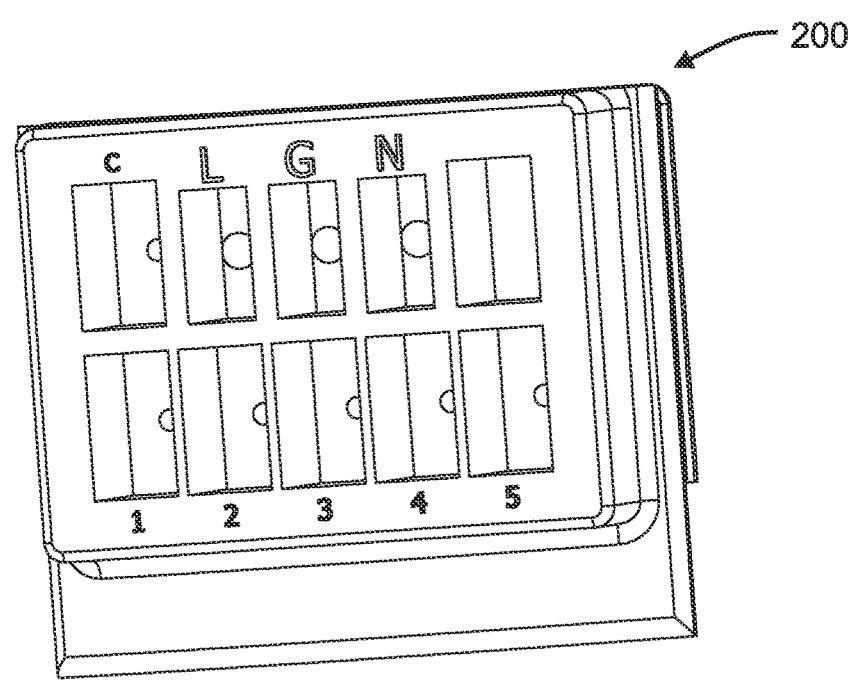
FIG. 9 is a perspective view of an electrical connector that can be mounted to the motor assembly of FIG. 1.
Figure 10:
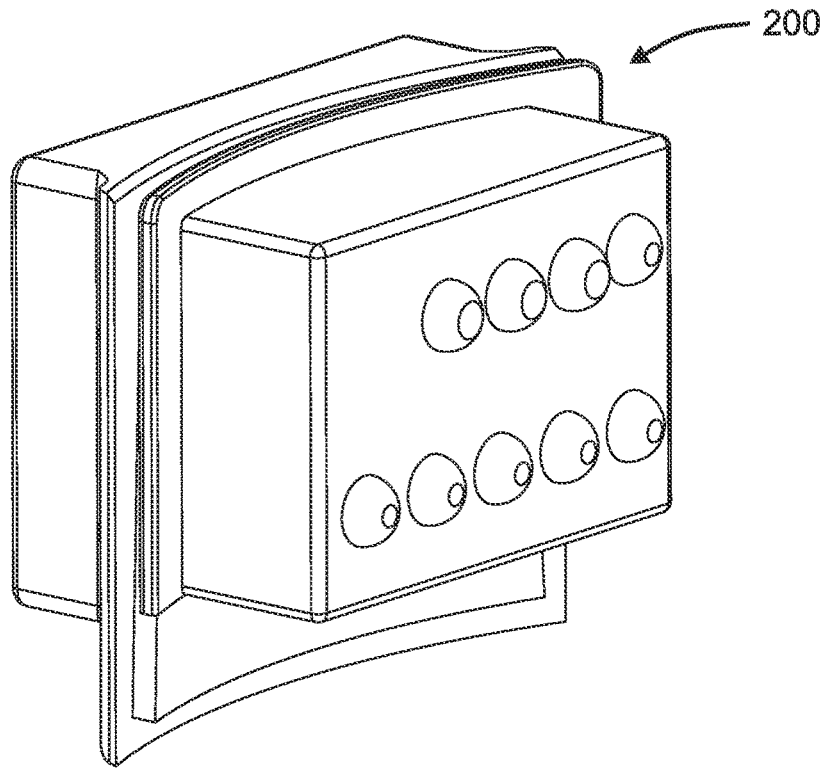
FIG. 10 is a further perspective view of the electrical connector of FIG. 9.

The casing 14 includes a receiver 30 formed as a cut out or notch in the housing defined by the casing 14. The receiver 30 is configured to receive and mount an electrical connector, such as the electrical connector 200 shown in FIGS. 9 and 10. The connector 200 can be used, for example, to connect the interior assembly 22 to a power supply, e.g., an electrical power supply that feeds electrical current to the wire windings of the interior assembly 22 via a controller (e.g., a control board, printed circuit board, etc.) positioned in the motor interior and that is itself operatively connected to an internal connector 32 of the interior assembly 22 via the internal connector's conductive pins 34.

A torque shaft can extend through the interior assembly 22 along the axis 12. Such a torque shaft is driven by the rotor of the motor. The torque shaft is coupled to, and thereby can transmit torque to, one or more parts of a machine containing the electric motor assembly 10 or external to the electric motor assembly. In some examples, the torque shaft is coupled to a force dissipation component, such as a fly wheel, adapted to maintain rotational speed of the motor by virtue of the flywheel's inertia.

At each end 16 and 18 of the casing 14, an end cap can be mounted to enclose the interior assembly 22 within the interior 20 of the casing 14. The torque shaft can extend through an opening in one or both end caps to an exterior of the casing 14, wherein the torque shaft is coupled to another component that it drives. An example end cap and torque shaft are shown in FIG. 1 of U.S. Pat. No. 10,965,176, the contents of which are hereby incorporated by reference in their entirety.

Figure 4:
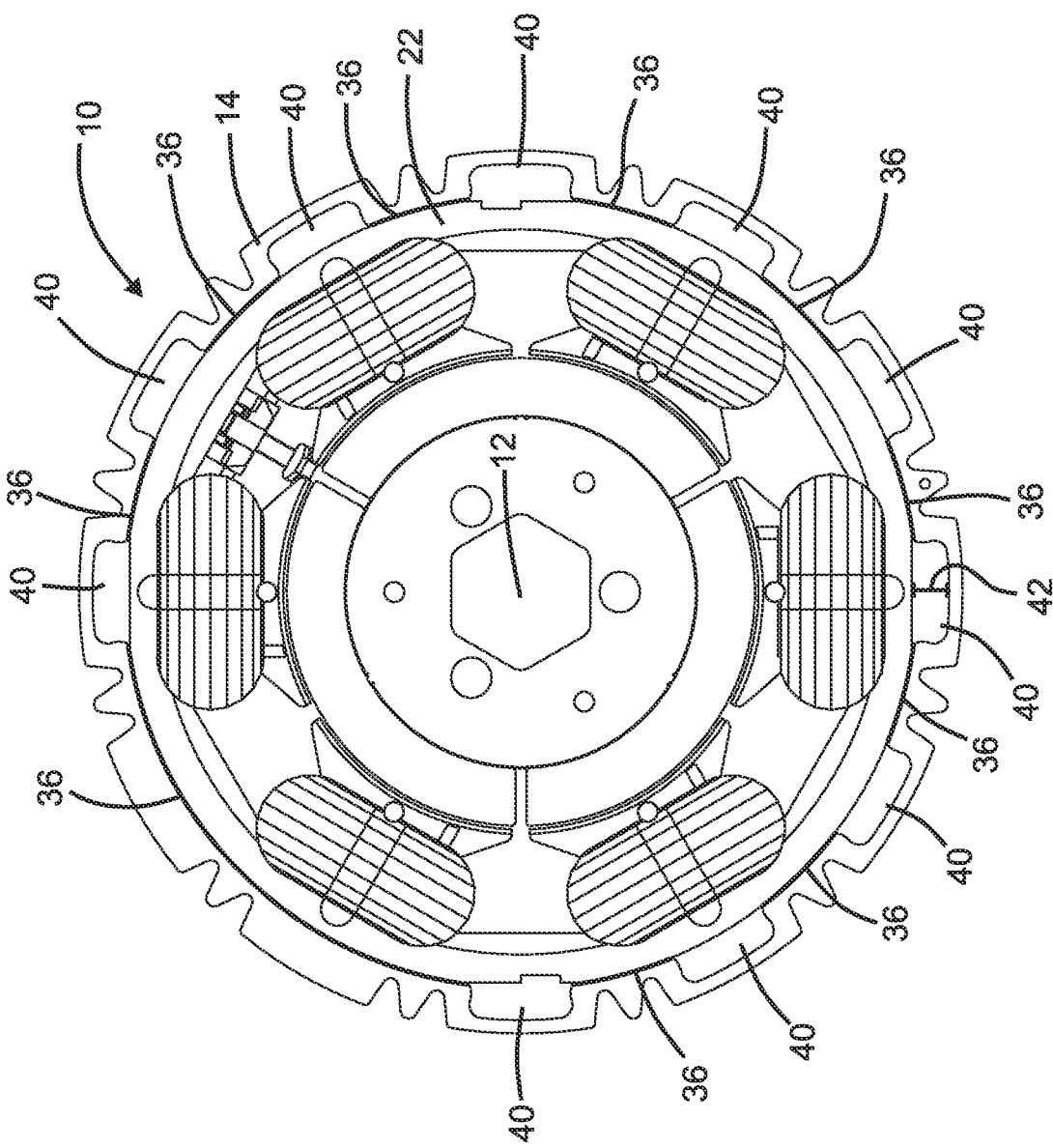
FIG. 4 is an end view of the motor assembly of FIG. 1.

Referring to FIG. 4, the outer surfaces of the interior assembly 22 are press fitted to inner surfaces of the casing 14 at press fit interfaces 36 distributed circumferentially around the axis 12. In some examples, the interfaces 36, or at least a portion of the interfaces 36 are equally or evenly circumferentially spaced from one another. In some examples, the interfaces 36 define an interference fit between the interior assembly 22 (particularly, the stator core 46 (FIGS. 5-7) and the interior surface of the casing 14.

Adjacent pairs of the interfaces 36 are separated by structural features. In this example, the structural features are channels 40 defined by the casing 14. The channels 40 are configured to change shape while the interior assembly 22 is press fitted to the casing 14, thereby facilitating the press fit process and facilitating even radial expansion (away from the axis 12) of the casing 14 during the press fitting process, such that the casing 14 does not bend or warp in undesirable ways during the press fitting process. For example, a radial depth 42 of each channel 40 decreases while the interior assembly 22 is press fitted to the casing 14, thereby facilitating the press fit process and facilitating even radial expansion (away from the axis 12) of the casing 14 during the press fitting process, such that the casing 14 does not bend or warp in undesirable ways during the press fitting process. The channels 40 will be described in further detail below.

Figure 5:
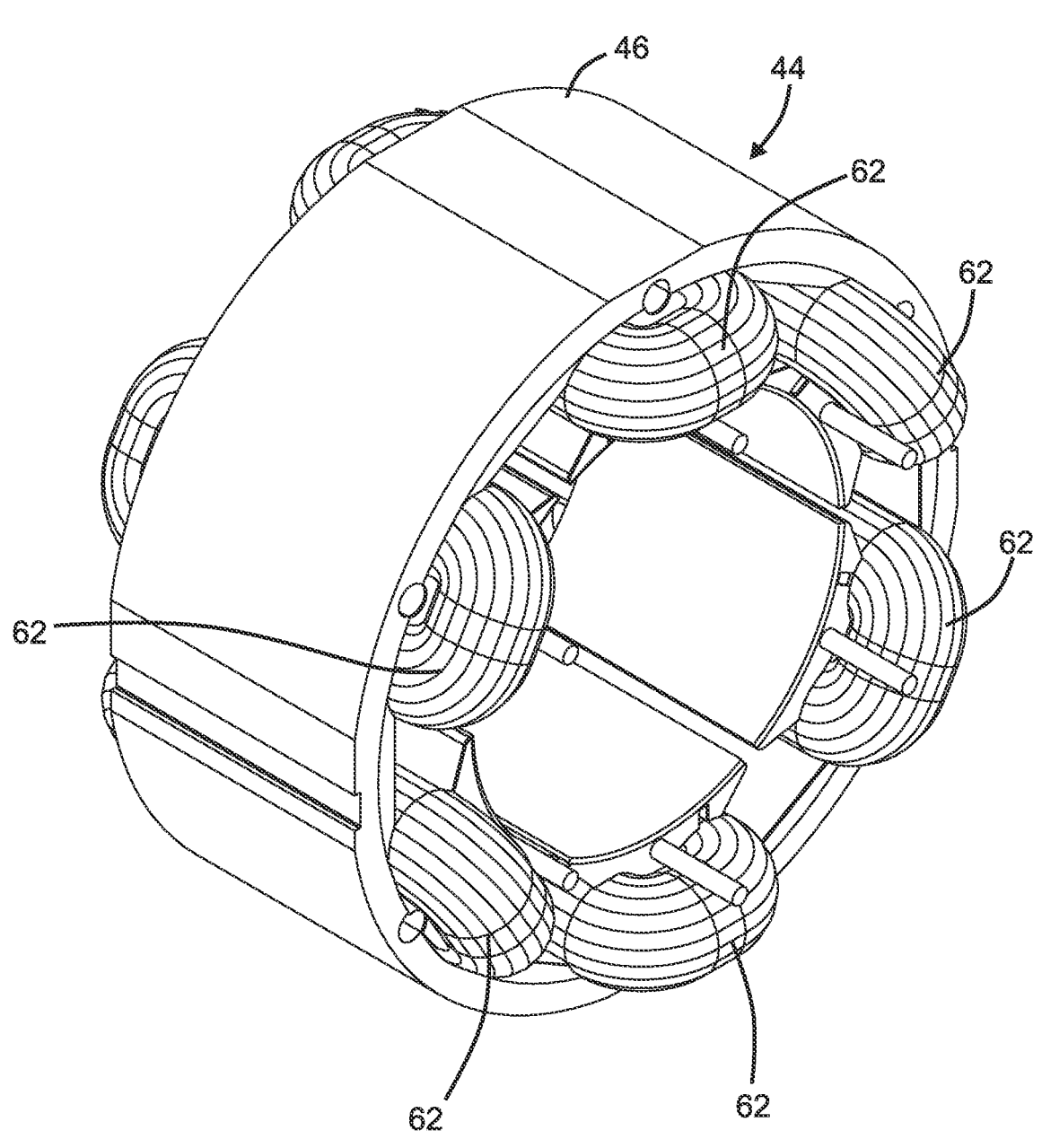
FIG. 5 is a perspective view of the stator of the motor assembly of FIG. 1.
Figure 6:
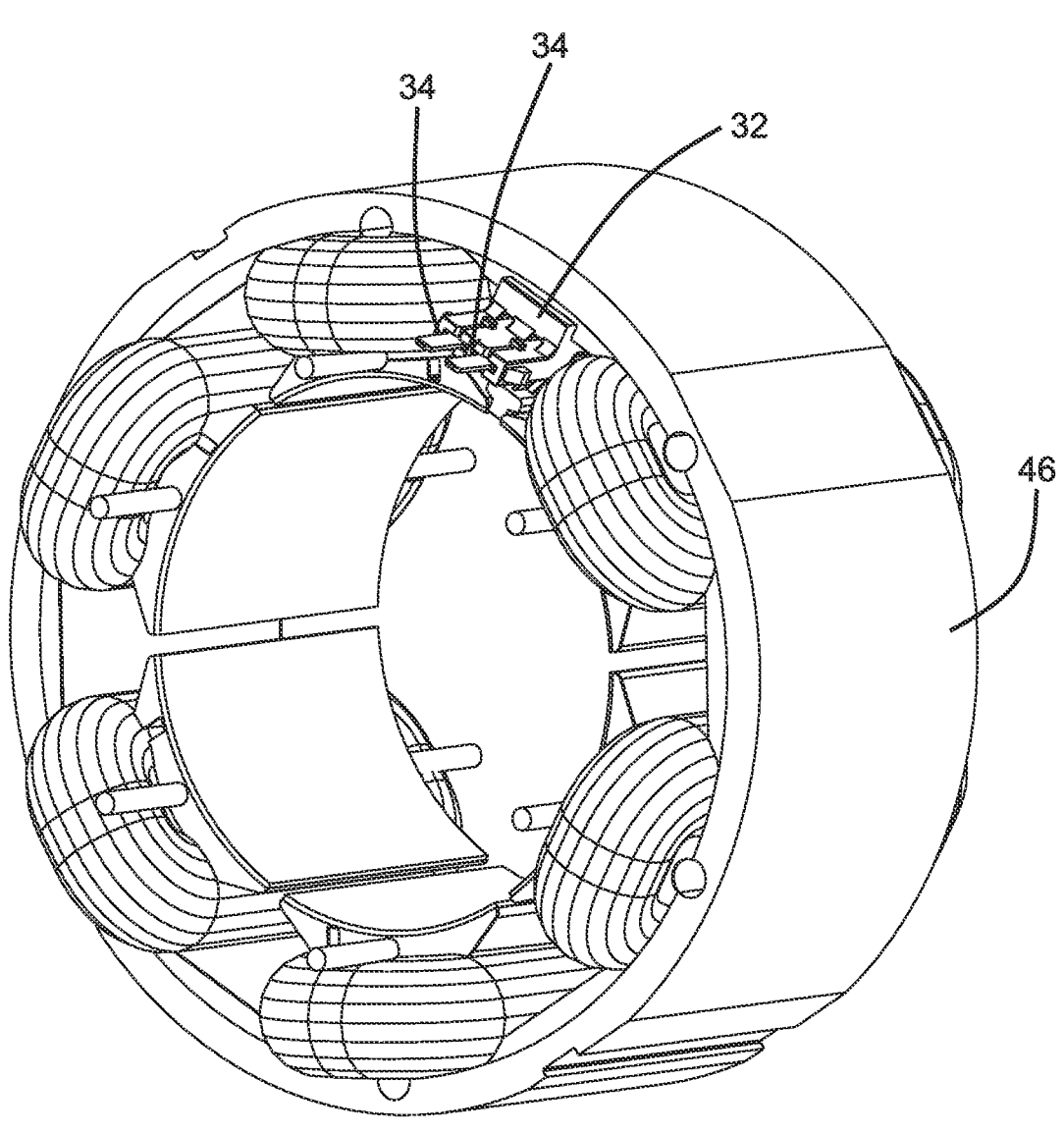
FIG. 6 is a further perspective view of the stator of FIG. 5.
Figure 7:
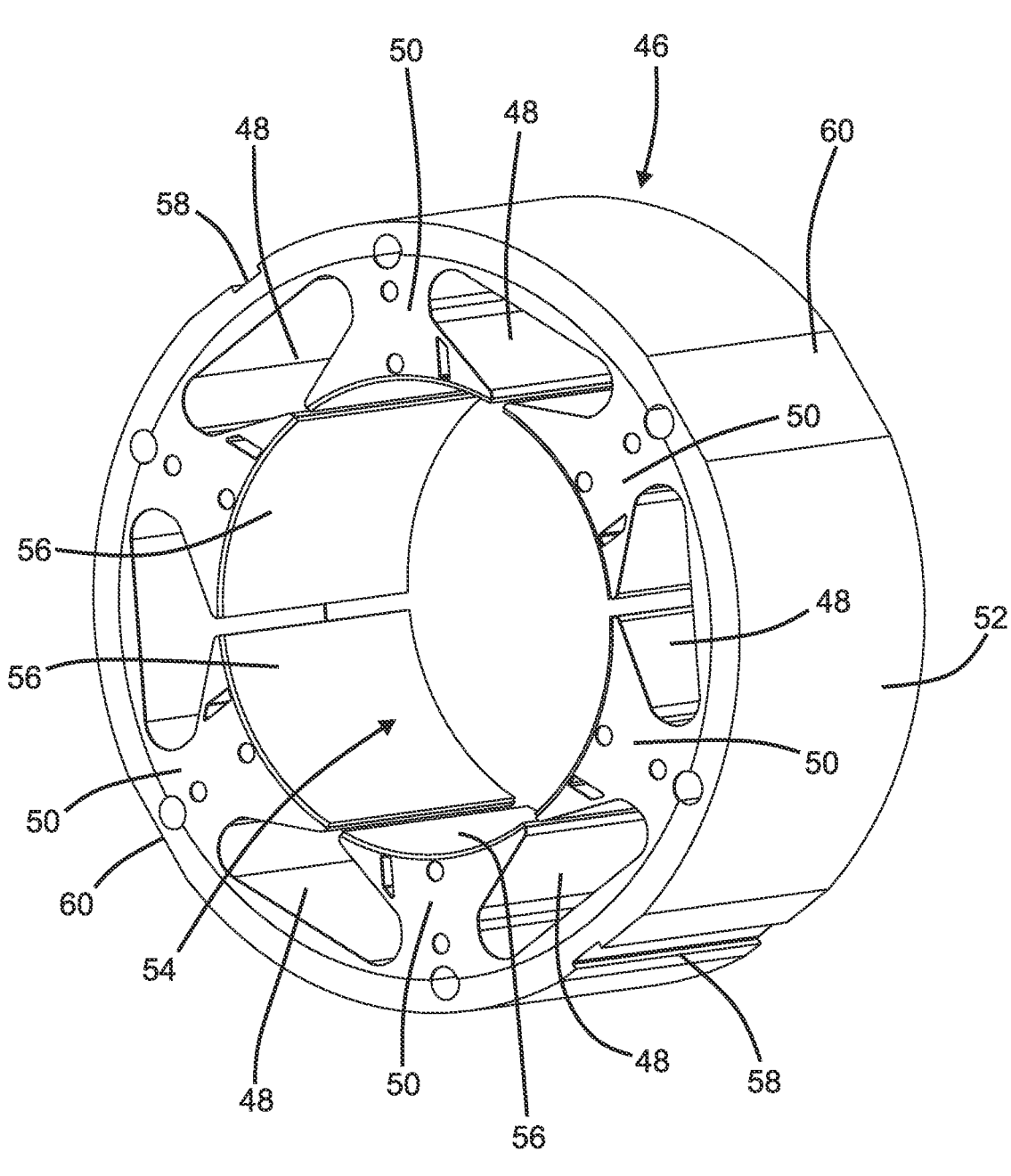
FIG. 7 is a perspective view of the stator core of the stator of FIG. 5.

Referring to FIGS. 5-7, the stator 44 of the interior assembly 22 will be described.

The stator 44 includes a stator core 46. The stator core 46 has a central opening 54 that is coaxial with the axis 12 when the stator 44 is installed in the casing 14 (FIG. 2). The central opening 54 is defined by inner surfaces 56 of projections 50 of the stator core 46. The central opening 54 is configured to receive the rotor of the interior assembly 22 and a portion of the torque shaft.

An outer surface 52 of the stator core 46 is configured for press fit engagement (e.g., via interference fit) with corresponding inner surfaces of the casing 14. Grooves 58 and/or planar portions 60 of the outer surface 52 can facilitate the press fit process and/or can provide keying of the stator core 46 into proper orientation within the casing 14 by alignment or orientation of the features 58, 60 with corresponding complementary features of the inner surfaces of the casing 14.

The projections 50 alternate with cavities 48 defined by the stator core 46. The cavities 48 receive wire windings 62 that are secured by disposing them around the projections 50.

In some examples, the stator core 46 is constructed of laminated steel. In some examples, the wire windings 62 are copper wire windings.

Figure 8:
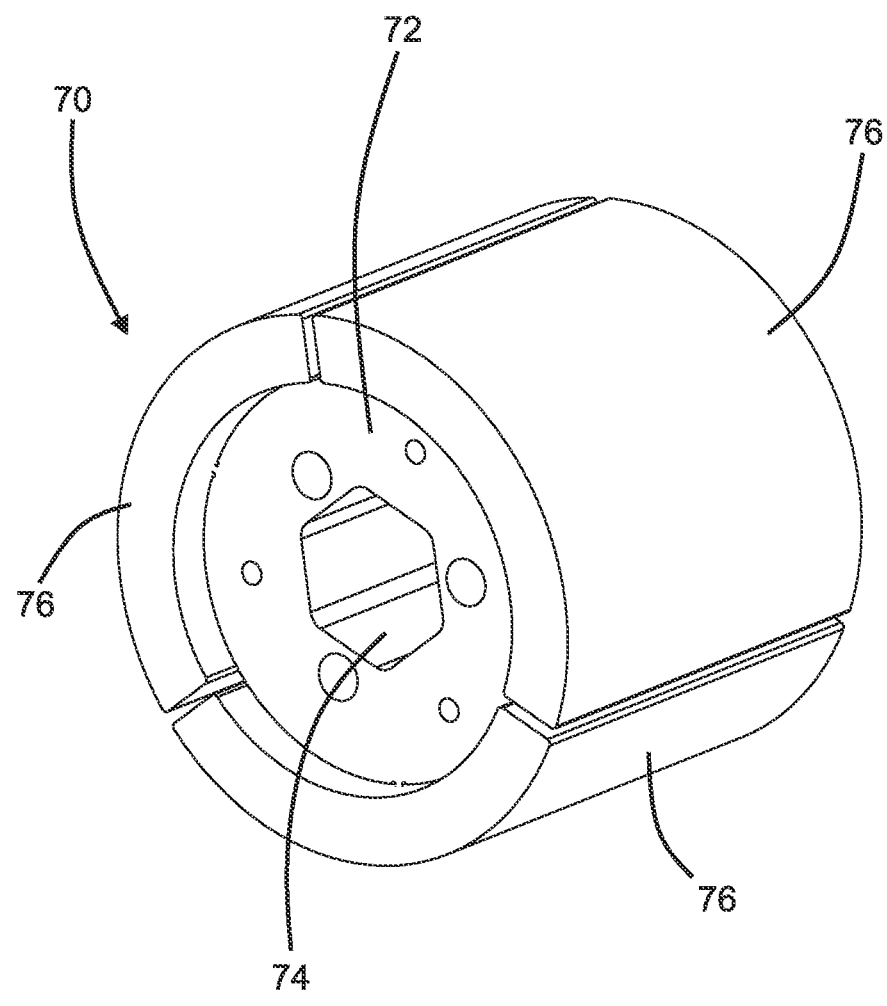
FIG. 8 is a perspective view of the rotor of the motor assembly of FIG. 1.

Referring to FIG. 8, the rotor 70 of the interior assembly 22 will be described.

The rotor 70 is received in the central opening 54 of the stator core 46 (FIGS. 5-7).

The rotor 70 includes a rotor core 72 that defines a central opening 74 that receives the torque shaft. The central opening 74 is coaxial with the axis 12 when the interior assembly 22 is installed in the casing 14 (FIG. 2).

Positioned about an outer surface of the rotor core 72 is a permanent magnet arrangement. In this example, the permanent magnet arrangement includes three permanent magnets 76 evenly circumferentially distributed around the rotor core, and around the axis 12 when the interior assembly 22 is installed in the casing 14 (FIG. 2). Other permanent magnet arrangements are possible.

When electric current is run through the wire windings of the stator, a dynamic magnetic flux is generated that interacts with the permanent magnet arrangement of the rotor 70 and causes the rotor 70 and, thereby, the torque shaft, to spin.

Figure 11:
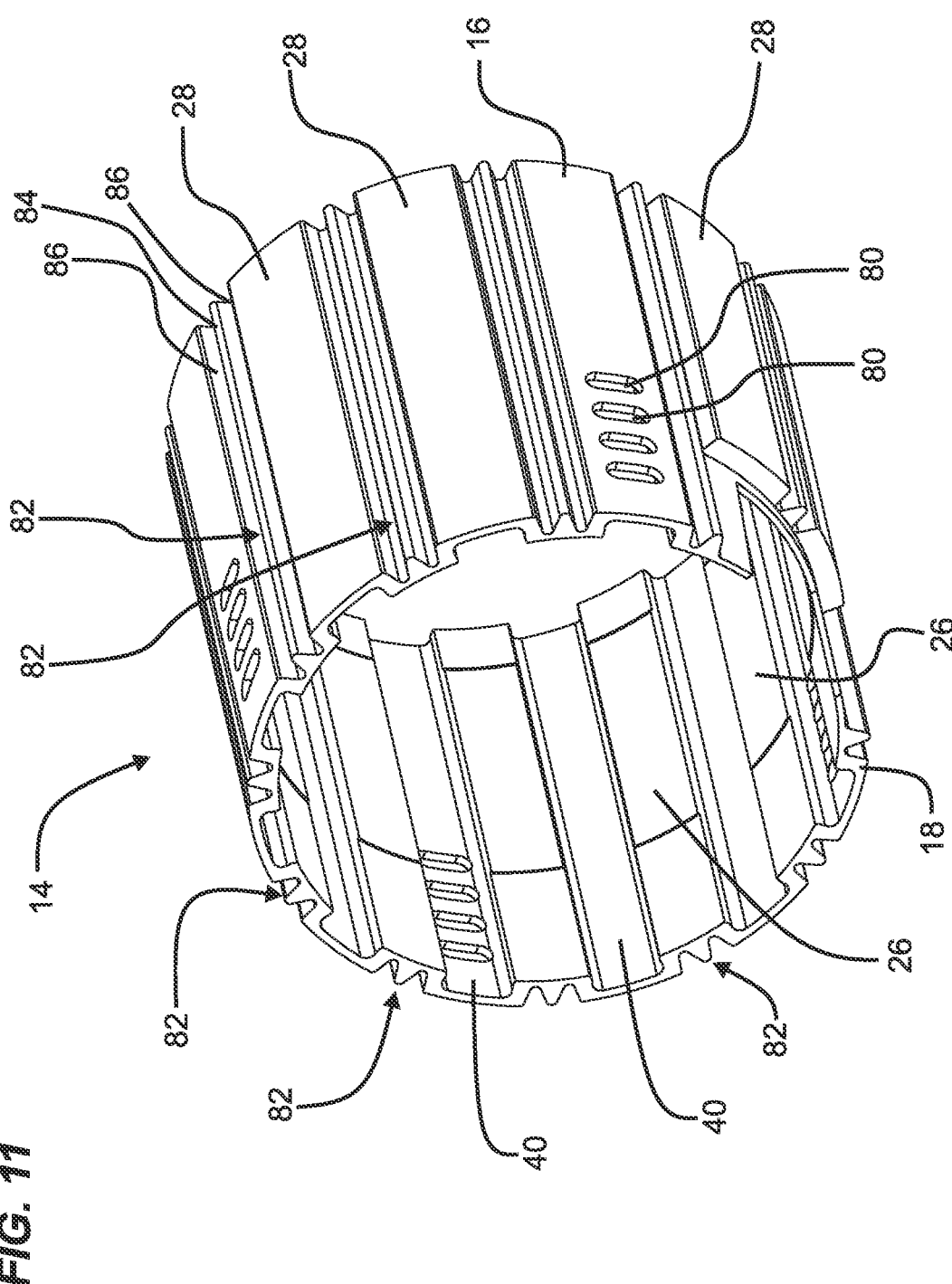
FIG. 11 is a perspective view of the casing of the motor assembly of FIG. 1.
Figure 12:
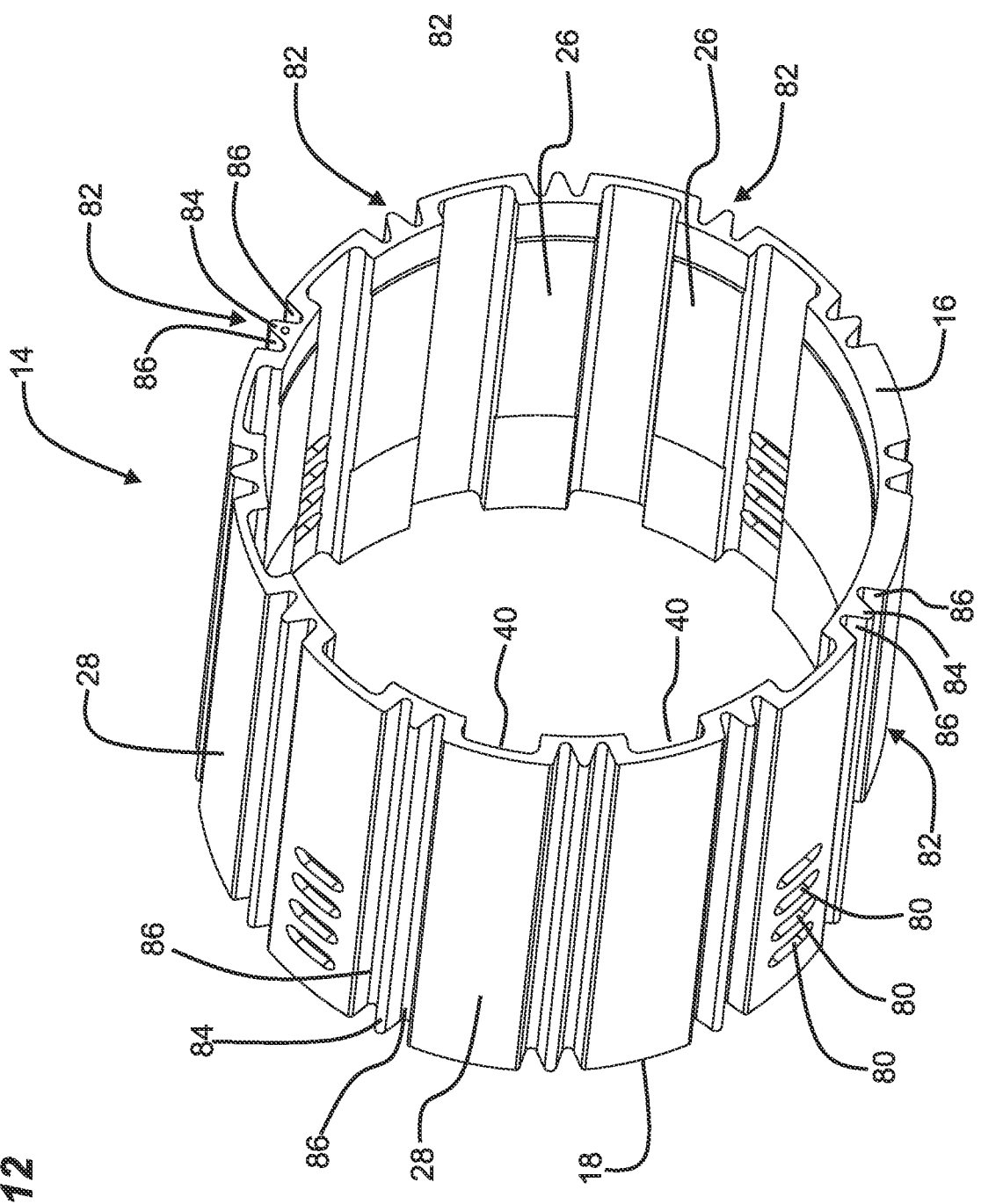
FIG. 12 is a further perspective view of the casing of FIG. 11.

Referring to FIGS. 11-12, the casing 14 will be further described.

The casing 14 includes the channels 40 circumferentially distributed about the inner surface of the casing 14.

Each channel 40 is recessed away from the axis 12 (FIG. 2).

Each channel 40 is elongate parallel to the axis 12 (FIG. 2). In this example, each channel 40 extends along the entire dimension of the casing 14 from the end 16 to the end 18 of the casing 14. Because the channels 40 are elongate parallel to the axis 12, even or substantially even radial expansion of the casing 14 when the interior assembly 22 is press fitted therein can be achieved.

In some examples, the outer surface 28 of one or more of the channels 40 and/or the outer surface of another portion of the casing 14 can include one or more through holes 80. The through holes 80 can enhance heat transfer away from the interior assembly 22 (FIG. 2) and into the motor's external environment. For example, if a fan is included with the interior assembly, hot air blown by the fan can be passed to the exterior of the motor via the holes 80.

Alternating with the channels 40 are portions 82 of the casing 14. Each portion 82 is elongate parallel to the axis 12 (FIG. 2). In this example, each portion 82 extends along the entire dimension of the casing 14 from the end 16 to the end 18 of the casing 14. That is, each portion 82 is coextensive parallel to the axis 12 with the adjacent channel 40 or channels 40.

The inner surface of each portion 82 includes the inner surface 26 that forms an interference fit with the interior assembly when the interior assembly is inserted in the casing 14 and press fit thereto. In this example, the outer surface of each portion 82 includes a rib 84 defined by grooves 86 on either side. This rib and groove arrangement can improve heat dissipation by the casing 14 away from the interior assembly.

The rib and groove arrangement can also facilitate even radial expansion of the casing 14 when an interference fit is being established with the interior assembly. For example, the grooves 86, which are constructed of thinner material than the rib 84, can distribute press fit forces radially on either side of the thicker rib and thereby encourage even radial expansion of the casing 14.

With radial expansion of the casing 14, or radial expansion of at least portions of the casing corresponding to the portions 82, some circumferential expansion (about the axis 12) can also occur whereby the configurations of the channels 40 can change. For example, the radial depth 42 (FIG. 4) of each channel 40 can shrink due to the radial and/or circumferential expansion of the portions 82.

In some examples, the portions of the casing that include the channels radially expand together with, and evenly with, the portions between the channels when the interior assembly is press fitted to the casing.

Advantageously, the arrangement and/or configuration of channels 40 and, in some examples, the ribs 84 and grooves 86, can allow for a suitable interference fit between the interior assembly and the casing 14 without the need to heat the casing 14 (other than heat generated by friction of press fitting the interior assembly to the casing 14) to make the casing more malleable for the press fitting process.

In other examples, heat is supplied to the casing 14 to help expand the casing for fitting of the interior assembly therein. In these examples, the channels can facilitate distributing the expansion force evenly about the casing axis during installation of the interior assembly into the casing.

Figure 13:
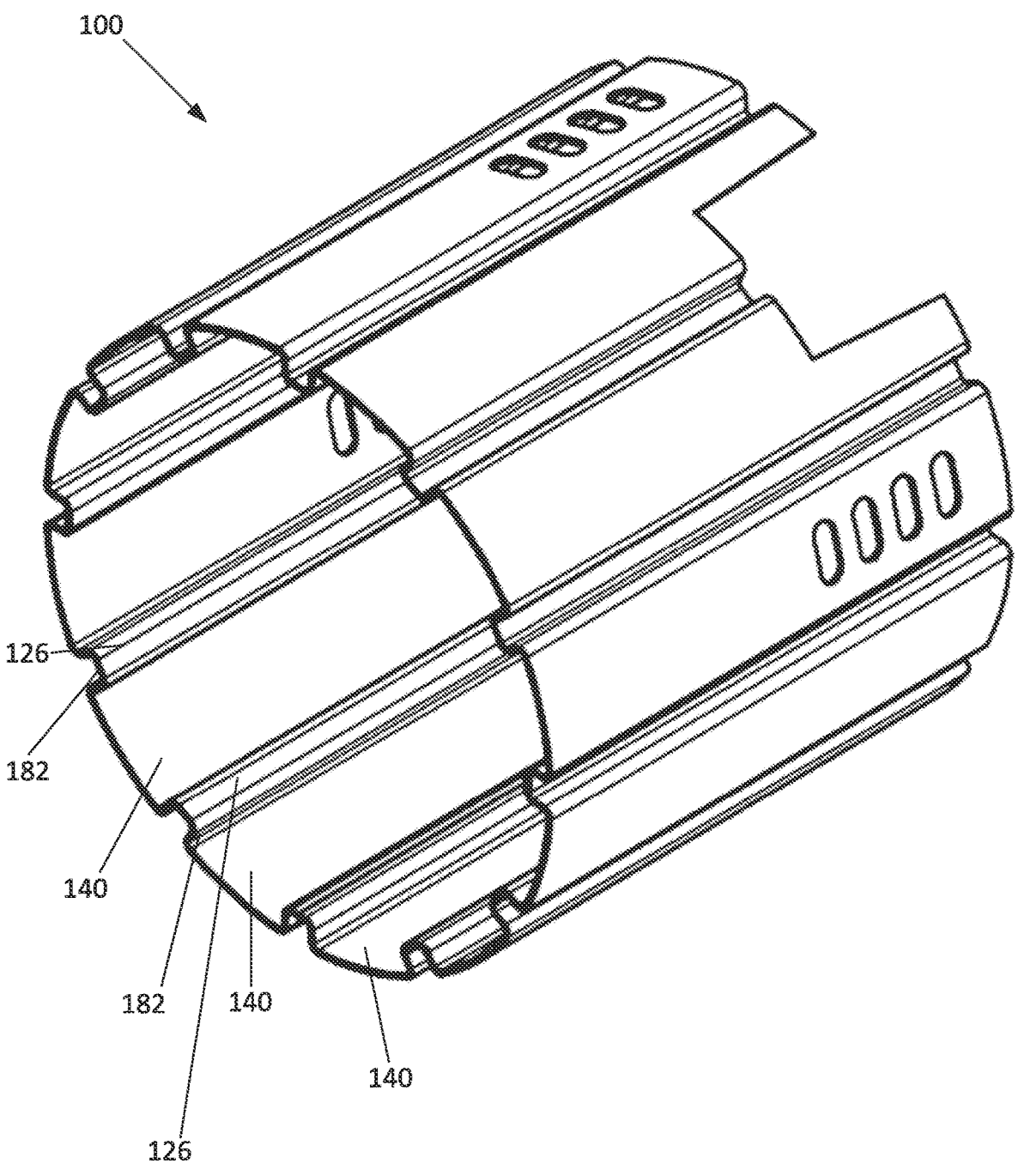
FIG. 13 is a perspective view of a further example of a motor casing according to the present disclosure.

FIG. 13 is a perspective view of a further example of a motor casing 100 according to the present disclosure.

In some examples, the casing 100 is constructed of steel and is fabricated by stamping (e.g., stamping the channels 140) into a sheet of steel, rolling the sheet of steel, and then welding together the ends of the sheet of steel. The casing 100 can be sufficiently malleable to expand and/or otherwise change shape when an interior motor assembly is press fitted therein.

As mentioned, the casing 100 includes channels 140. The channels 140 are circumferentially distributed about the inner surface of the casing 100. The channels 140 function similarly to the channels 40 described above.

Each channel 140 is recessed away from the central axis of the casing 100.

Each channel 140 is elongate parallel to the central axis of the casing 100. Because the channels 140 are elongate parallel to the central axis of the casing 100, even or substantially even radial expansion of the casing 140 when an interior assembly (such as the interior assembly 22 described above) is press fitted in the casing 100 can be achieved.

In some examples, the outer surface of one or more of the channels 140 and/or the outer surface of another portion of the casing 100 can include one or more through holes, which function like the through holes 80 described above.

Alternating with the channels 140 are portions 182 of the casing 100. Each portion 182 is elongate parallel to the central axis. The inner surface of each portion 182 includes an inner surface 126 that forms an interference fit with the interior assembly when the interior assembly is inserted in the casing 100 and press fit thereto. In this example, the outer surface of each portion 182 does not include a rib. In other examples, the outer surface of each portion 182 or least one of the portions 182 does include a rib, which can function like the rib 84 described above.

With radial expansion of the casing 100, or radial expansion of at least portions of the casing corresponding to the portions 182, some circumferential expansion (about the central axis of the casing 100) can also occur whereby the configurations of the channels 140 can change. For example, the radial depth away from the central axis of each channel 110 can shrink due to the radial and/or circumferential expansion of the portions 182.

In some examples, the portions of the casing 100 that include the channels 140 radially expand together with, and evenly with, the portions between the channels when the interior assembly is press fitted to the casing 100.

Advantageously, the arrangement and/or configuration of channels 140 can allow for a suitable interference fit between the interior assembly and the casing 100 without the need to heat the casing 100 (other than heat generated by friction of press fitting the interior assembly to the casing 100) to make the casing more malleable for the press fitting process. In other examples, external heat is supplied to the casing 100 to facilitate the press fitting process.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. An electric motor casing, comprising:
a casing housing including an inner surface and an outer surface, the casing housing extending along an axis defined by the casing housing from a first end of the casing housing to a second end of the casing housing opposite the first end, the inner surface of the casing housing defining a channel extending from the first end of the casing housing to the second end of the casing housing parallel to the axis, the channel being elongate parallel to the axis, the casing housing being configured to receive within the casing housing an interior motor assembly inserted into the casing housing through the first end or the second end along the axis,
wherein the channel is configured such that a radial depth of the channel perpendicular to the axis decreases when the motor assembly is inserted into the casing housing and press fit to the casing housing.

2. The electric motor casing of claim 1, wherein the channel is recessed away from the axis.

3. The electric motor casing of claim 1, wherein the inner surface of the casing housing includes a plurality of channels each being elongate parallel to the axis and recessed away from the axis.

4. The electric motor casing of claim 1, wherein the first end is open and the second end is open.

5. The electric motor casing of claim 1,
wherein the first end is configured to receive a first end cap to cover the first end; and
wherein the second end is configured to receive a second end cap to cover the second end.

6. The electric motor casing of claim 1, wherein the casing housing is constructed of material that includes aluminum or a material that includes steel.

7. An electric motor assembly, comprising:
a casing housing including an inner surface and an outer surface, the casing housing extending along an axis defined by the casing housing from a first end of the casing housing to a second end of the casing housing opposite the first end, the inner surface of the casing housing defining a channel extending from the first end of the casing housing to the second end of the casing housing parallel to the axis; and an interior motor assembly configured to be press fit to the casing housing by inserting the interior motor assembly through the first end or the second end along the axis,
wherein the channel is configured such that a radial depth of the channel perpendicular to the axis decreases when the motor assembly is inserted into the casing housing and press fit to the casing housing.

8. The electric motor assembly of claim 7, wherein the interior motor assembly includes a stator.

9. The electric motor assembly of claim 8, wherein the stator includes a stator core and wire windings.

10. The electric motor assembly of claim 9, wherein the interior motor assembly includes a rotor within the stator, the rotor being configured to spin about a rotation axis that coincides with the axis when the interior motor assembly is press fit to the casing housing.

11. The electric motor assembly of claim 10, further comprising a torque shaft within the rotor and configured to spin by rotation of the rotor when the interior assembly is press fit to the casing housing.

12. The electric motor assembly of claim 7, wherein the channel is recessed away from the axis.

13. The electric motor assembly of claim 7, wherein the inner surface of the casing housing includes a plurality of channels recessed away from the axis, each of the plurality of channels having a shape that is configured to change when the interior motor assembly is press fit to the casing housing.

14. The electric motor assembly of claim 13, wherein each of the plurality of channels is elongate parallel to the axis.

15. The electric motor assembly of claim 7,
wherein the first end is open and the second end is open,
the assembly further comprising:
a first cover configured to cover the first end when the interior motor assembly is press fit to the casing housing; and
a second cover configured to cover the second end when the interior motor assembly is press fit to the casing housing.

16. The electric motor assembly of claim 7, wherein the casing housing is constructed of material that includes aluminum or steel.

17. A method of assembling an electric motor, comprising:
inserting an interior motor assembly within a motor casing housing, to press fit the interior motor assembly to the motor casing housing, the inserting causing a channel defined by an inner surface of the motor casing housing and extending from a first end of the motor casing housing to a second end of the motor casing housing parallel to an axis defined by the motor casing housing to decrease in a radial depth of the channel perpendicular to the axis, and further causing the motor casing housing to expand,
wherein no heat is applied to the motor casing housing to press fit the interior motor assembly to the motor casing housing other than heat generated by the inserting.

18. The method of claim 17, further comprising:
prior to the inserting, fabricating the motor casing housing by stamping, rolling and welding a piece of material containing steel.

19. An electric motor assembly, comprising:
a casing housing including an inner surface and an outer surface, the casing housing extending along an axis defined by the casing housing from a first end of the casing housing to a second end of the casing housing opposite the first end, the inner surface of the casing housing defining a channel extending from the first end of the casing housing to the second end of the casing housing parallel to the axis; and an interior motor assembly configured to be press fit to the casing housing by inserting the interior motor assembly through the first end or the second end along the axis, wherein the channel is configured such that a shape of the inner surface defining the channel changes when the interior motor assembly is press fit to the casing housing.

* * * * *